March 21, 1967     N. P. MILLAR ETAL     3,310,666
APPARATUS FOR CALCULATING THE THRUST OF A JET ENGINE
Filed Oct. 16, 1961     4 Sheets-Sheet 1

INVENTORS
NORVAL P. MILLAR
MALCOLM E. DOUGLASS
BY
THEIR ATTORNEY

March 21, 1967   N. P. MILLAR ETAL   3,310,666
APPARATUS FOR CALCULATING THE THRUST OF A JET ENGINE
Filed Oct. 16, 1961   4 Sheets-Sheet 3

INVENTORS
NORVAL P. MILLAR
MALCOLM E. DOUGLASS
BY
Richard E. Hurley

THEIR ATTORNEY

March 21, 1967   N. P. MILLAR ETAL   3,310,666
APPARATUS FOR CALCULATING THE THRUST OF A JET ENGINE
Filed Oct. 16, 1961   4 Sheets-Sheet 4

INVENTORS
NORVAL P. MILLAR
MALCOLM E. DOUGLASS
BY Richard E. Hosley
THEIR ATTORNEY United States Patent Office 3,310,666
Patented Mar. 21, 1967

3,310,666
APPARATUS FOR CALCULATING THE THRUST
OF A JET ENGINE
Norval P. Millar, Danvers, and Malcolm E. Douglass,
Wenham, Mass., assignors to General Electric Company, a corporation of New York
Filed Oct. 16, 1961, Ser. No. 145,219
4 Claims. (Cl. 235—193)

This invention relates to thrustmeters and more particularly to apparatus for measuring, computing, and continuously indicating the thrust of a reaction motor such as a jet engine used to propel aircraft.

With the advent of jet-propelled aircraft, there has arisen a great need for a reliable instrument for indicating continuously to the pilot both on the ground and in the air the thrust developed by each jet engine. Such instruments are needed on the ground to determine at a glance whether the engine thrust developed during take-off is adequate before it is too late to stop at the end of the runway. Also, they are needed in flight to check individual engine performance, for thrust balancing on multiengine aircraft, and for determining thrust limits for protection of the engine and the airframe.

In seeking practical solutions to this problem, one approach that has been used is to derive an equation from thermodynamic principles expressing the gross thrust of a jet engine in terms of variables that can be measured while the engine is in operation, such as pressure, temperature, engine r.p.m., etc. These variables are then measured and fed into a computer which relates the variables in accordance with the developed equation and then computes the thrust as an output which is visibly presented to the pilot by a suitable read-out mechanism. One practical problem encountered with this approach is that the derived equation is so complex that the computer implementation is complex and costly. Another problem with this approach is the lack of flexibility of the equipment, requiring costly changes to make it applicable to different engines.

Accordingly, it is an object of the present invention to provide a thrustmeter for a jet engine which is much simpler, more reliable, and less costly than previous devices without sacrificing required accuracy.

A further object of the invention is to provide a thrustmeter which is more flexible in its application than prior devices so that it can be used with different engines operating under a wide range of conditions with only minor modifications.

Other objects and advantages of the invention will become apparent as the following description proceeds.

Briefly, in accordance with the invention, there is provided thrustmetering apparatus for indicating the gross thrust of a jet engine comprising a gross thrust computer requiring only a few input variables to produce an output indicative of gross thrust, these variables being, in the case of a variable nozzle engine, (1) total engine pressure upstream of the nozzle, (2) nozzle area, and (3) ambient air pressure. The operation of the thrustmeter is based on the discovery that gross thrust may be computed with required accuracy from the relatively simple empirical equation:

$$F_g = K_1 P_{am} f_3(A_n) f_2(P_T/P_{am})$$

wherein:

$F_g$ = gross thrust
$K_1$ = scale factor constant
$P_{am}$ = ambient pressure (absolute)
$P_T$ = engine nozzle total pressure (absolute)
$A_n$ = area of the nozzle and $f_3(A_n)$ and $f_2(P_T/P_{am})$ are functions of $A_n$ and $P_T/P_{am}$.

For fixed nozzle engines the above equation is simplified by elimination of $A_n$ as a variable and substitution of an appropriate constant with attendant simplification of the computer. The above equation may be mechanized by a relatively simple computer to compute gross thrust because of the small number of input variables required and also because only multiplication of these variables is involved, as will become more apparent as the following description proceeds.

For a more detailed description of the present invention, reference should now be made to the following detailed description taken in connection with the accompanying drawings in which.

Figures 1, 5:
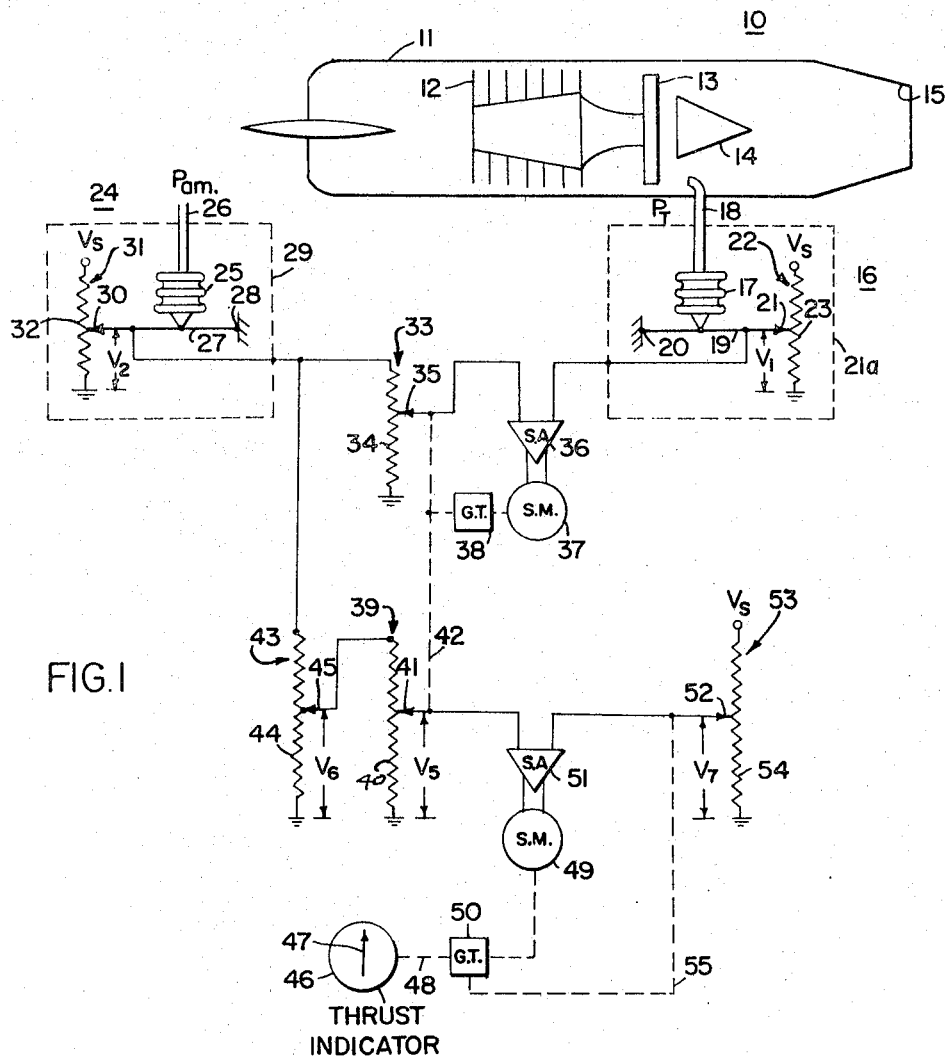
FIG. 1 is a schematic diagram of measuring and computing apparatus for indicating gross thrust of a fixed nozzle jet engine embodying the present invention.
Figure 2:
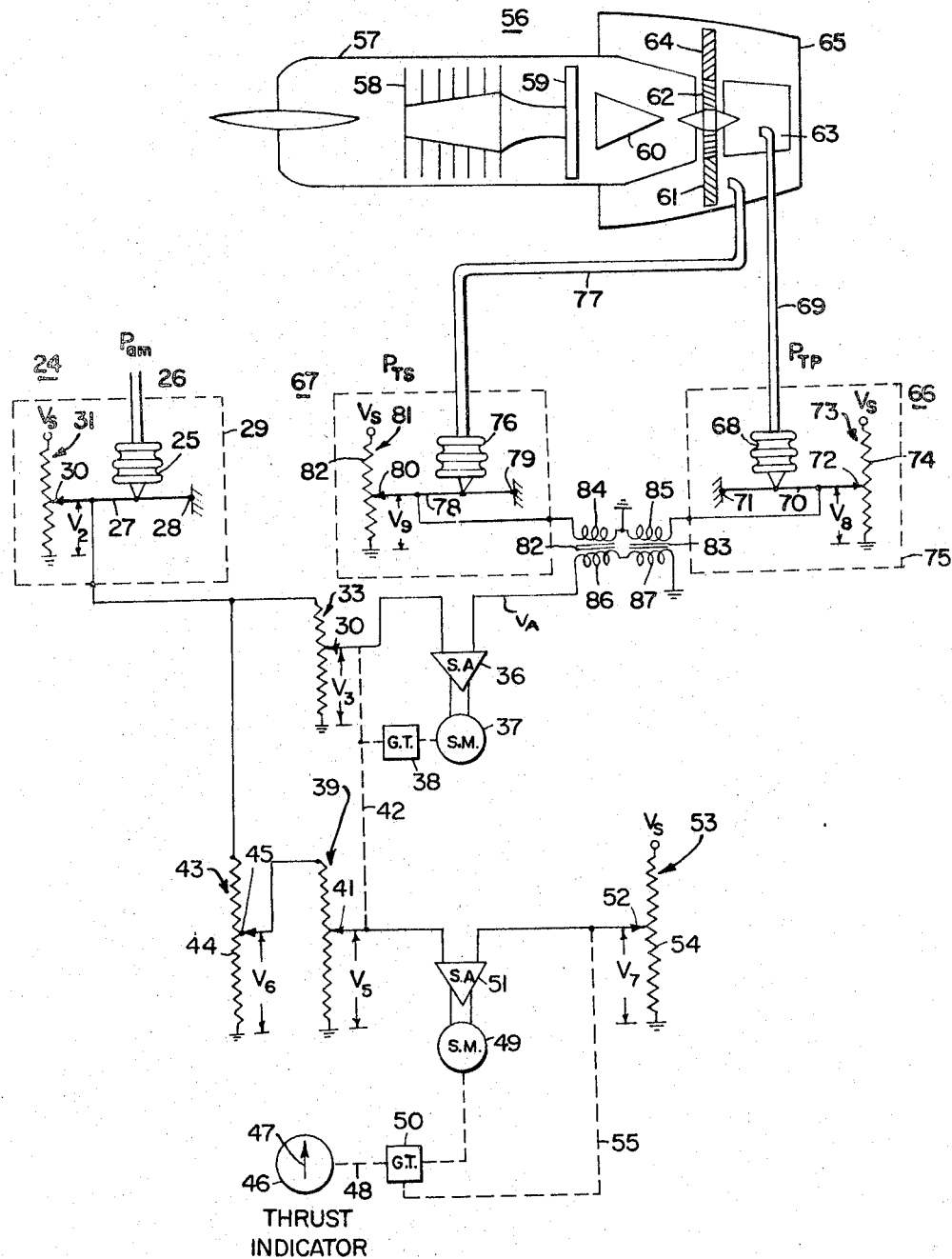
FIG. 2 shows a modification of the system of FIG. 1 for use with a turbofan engine having primary and secondary nozzles.
Figure 3:
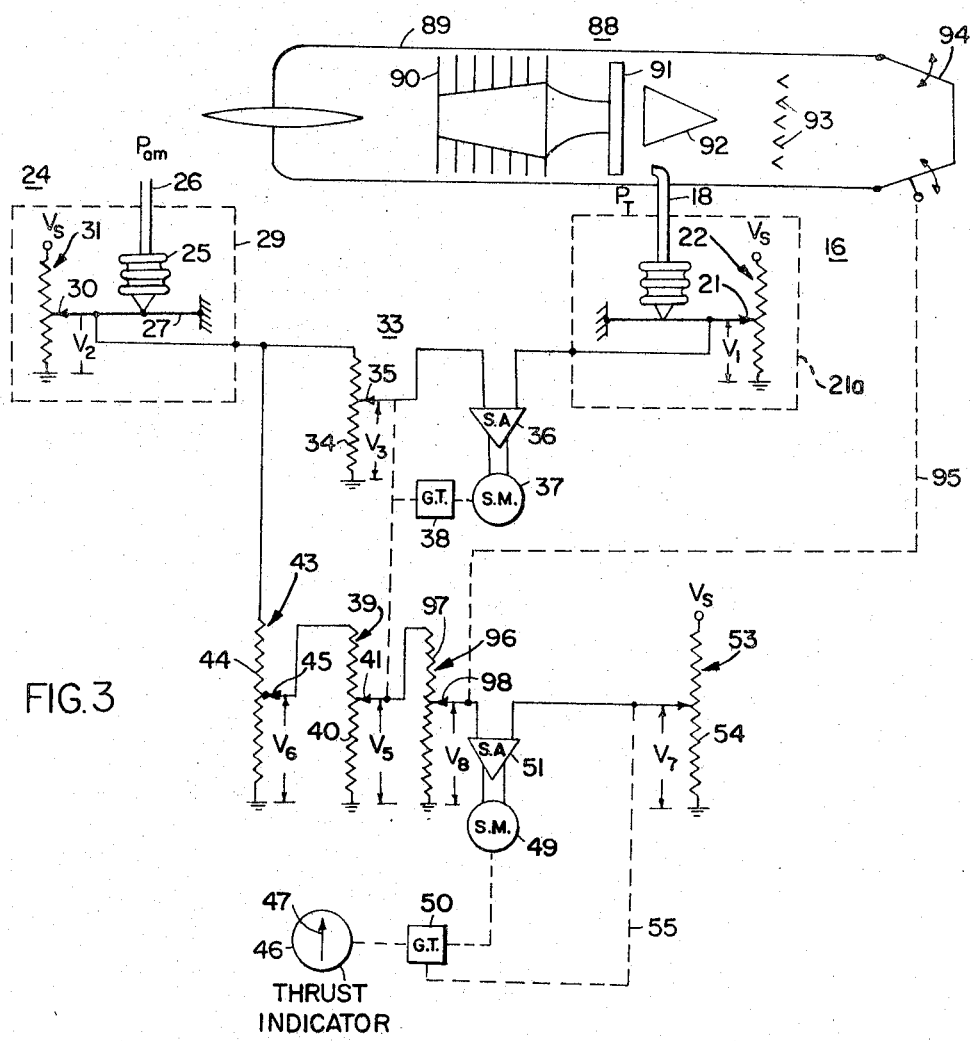
FIG. 3 shows a further modification of the system of FIG. 1 for use with a jet engine provided with an afterburner and a variable nozzle.
Figure 6:
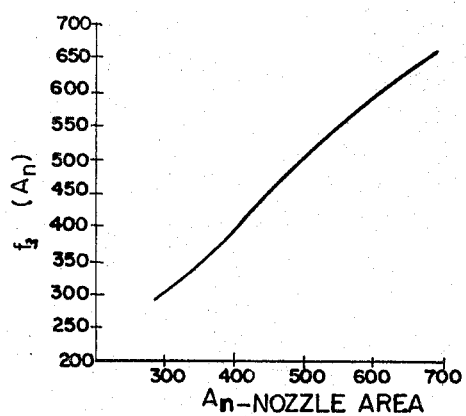

FIG. 5 is a graphical representation of a typical characteristic of a function generator associated with a pressure ratio transducer forming a component of the gross thrust measuring and computing systems illustrated in FIGS. 1, 2, and 3; and FIG. 6 is another graphical representation showing a typical characteristic of a function generator associated with the nozzle area transducer used as a component of the gross thrust measuring and computing system such as that illustrated in FIG. 3.

Referring now to FIG. 1 of the drawing, there is disclosed in schematic form measuring and computing apparatus for indicating the gross thrust of a fixed nozzle jet engine embodying the present invention. The jet engine, identified generally by the numeral 10, is illustrated in schematic form as comprising a casing 11 which houses a conventional compressor and turbine 12 and 13 discharging combustion gases past a diffuser 14 rearwardly through the tailpipe terminating in the fixed nozzle 15.

The present invention utilizes the discovery that the gross thrust of a jet engine is indicated with an acceptable degree of measurement accuracy by an empirical equation which has only a few variables and which is well suited for simple computer implementation because only multiplication of these variables is involved. For the case of the fixed nozzle engine referred to above, this equation in its simplest form is as follows:

(1)  $$F_g = K_3 P_{am} f_1(P_T/P_{am})$$

wherein:

$F_g$ = gross thrust
$K_3$ = scale factor constant
$P_{am}$ = ambient pressure (absolute)
$P_T$ = total nozzle pressure (absolute)
$f_1(P_T/P_{am})$ = function of pressure ratio $P_T/P_{am}$ It will be noted from the above equation that there are only two variables involved in the computation of gross thrust of the engine 10. These variables are the total nozzle pressure $P_T$ and the ambient pressure $P_{am}$. With reference to the nomenclature used, it should be noted that gross thrust is the total reaction force developed by the engine and is different from the net thrust which is available to propel the vehicle or aircraft on which the engine is mounted, the difference between the net thrust and the gross thrust being the ram drag thrust, as will be recognized by those skilled in the art. It is to be noted, also, that the total nozzle pressure $P_T$ is the sum of both the static pressure head and the velocity pressure head while the ambient pressure $P_{am}$ is static pressure, there being no velocity component involved.

In accordance with the present invention, an indication of the gross thrust $F_g$ is obtained by utilizing a computer which receives as input signals outputs from two pressure transducers which are responsive, respectively, to total pressure $P_T$ and ambient pressure $P_{am}$ and which produce output signals variable in accordance with these quantities. These output signals are then fed to the computer which produces a resultant signal indicative of gross thrust $F_g$. A suitable read-out mechanism is provided to give the pilot or other observer an indication of the computed gross thrust, this indicating instrument being responsive to the resultant output signal of the computer.

Mechanization of the foregoing equation in gross thrustmeter apparatus embodying the invention may be accomplished by well-known digital or analog computing techniques. As indicative of one form of mechanization of the equation, an analog type of computer is illustrated utilizing potentiometer-type multiplying circuits and servo-driven, nonlinear function generators. The details of this computing and indicating system suitable for use with a fixed nozzle turbojet engine 10 will now be described.

The input variable $P_T$ total nozzle pressure is sensed by a first pressure transducer indicated generally in FIG. 1 by the numeral 16. The pressure transducer is indicated schematically as comprising a flexible bellows 17, one end of which is connected to a pressure probe 18, the outer end of which is positioned so as to project directly into the jet stream at a suitable location upstream of the fixed nozzle 15. The lower moving end of the bellows 17 is connected to a pivoted lever 19, one end of which is pivotally connected to a fixed support 20 so that the lever 19 moves up and down with changes in internal pressure of the bellows 17. In order that the movement of the bellows may be indicative of absolute pressure, the bellows and the associated mechanism are housed within a suitable evacuated container indicated by the dash lines 21a. The outer end of the pivoted lever 19 is connected to the wiper arm 21 of a potentiometer 22. The potentiometer has a resistance element 23, one end of which is grounded and the other of which is connected to a suitable electrical power source. For the purpose of simplicity and clarity of illustration in the various figures of the drawing, the source is not shown; and it will be understood that the circuit connections from this source comprise two leads, one of which is connected to ground and the other is designated as $V_S$.

With the arrangement illustrated, the pressure transducer 16 produces as an output signal a variable voltage across the wiper arm 21 and ground designated on the drawing as $V_1$. The magnitude of this signal voltage $V_1$ is therefore indicative of the total pressure $P_T$ of the jet engine 10.

The ambient pressure $P_{am}$, which is the pressure around the jet engine during operating conditions, is sensed by a second pressure transducer 24 having a construction similar to the pressure transducer 16. This pressure transducer comprises a flexible bellows 25, the upper end of which is connected to a conduit or tube 26, the outer end of which is open to the atmosphere. The lower end of the bellows 25 is connected to a pivoted lever 27, one end of which is pivotally connected to a fixed support 28. In order that the movements of the bellows 25 may be indicative of absolute pressure, the bellows and its associated mechanism are housed within a suitable evacuated container indicated schematically by the dash lines 29. The other end of the pivoted lever 27 is connected to the wiper arm 30 of a potentiometer 31. The potentiometer has a resistance element 32, one end of which is grounded and the other is coupled to the power supply lead $V_S$. With this arrangement, variations in the ambient pressure as sensed by the tube 26 projecting outwardly outside of the evacuated container 29 causes movement of the wiper arm 30. The voltage $V_2$ across the wiper arm and ground is therefore a signal voltage variable in accordance with the ambient pressure $P_{am}$.

It will be noted that implementation of the Equation 1 requires the development of a pressure ratio signal variable in accordance with the pressure ratio $P_T/P_{am}$. The manner in which this pressure ratio signal is developed will now be described. It will be noted that there is provided a potentiometer 33 having a resistance element 34, one end of which is grounded. The other end of the resistance element is connected to the wiper arm 30 of the potentiometer 31 in pressure transducer 24 so that the voltage developed across the resistance element 34 of potentiometer 33 varies in accordance with the ambient pressure $P_{am}$. The potentiometer 33 has a wiper arm 35 connected to one of the input leads of a polarity-sensitive servo amplifier 36, the other input lead of the amplifier being coupled to the wiper arm 21 of the potentiometer 22 forming a part of the pressure transducer 16. It will be understood that the servo amplifier 36 is of known construction having an output connected to a servomotor 37, the arrangement being such that the servomotor rotates in a direction dependent upon the polarity of the signal impressed across the input leads of the servo amplifier. The output shaft of the servomotor is mechanically coupled to the wiper arm 35 of the potentiometer 33 through a suitable gear train 38. With this arrangement, the servomotor will position the wiper arm 35 of potentiometer 33 until the input of the servo amplifier 36 is reduced to zero. The position of the wiper arm 35 thus becomes a measure of the ratio of the voltages across the wiper arms of the potentiometers 22 and 31, which voltages vary as previously explained in accordance with the variables $P_T$ and $P_{am}$.

In order to generate the desired function of the pressure ratio $P_T/P_{am}$ and to effect the multiplication of the function of the pressure ratio and the ambient pressure, a circuit arrangement including potentiometer 39 is utilized. Potentiometer 39 has a resistance element 40 and a wiper arm 41 mechanically coupled by shaft 42 to wiper arm 35 of potentiometer 33 so that both wiper arms are positioned simultaneously by the servomotor 37. The position of the wiper arm 41 on resistance element 40 is therefore varied in accordance with the pressure ratio $P_T/P_{am}$. In order to obtained the desired function of the pressure ratio, the resistance element 40 is designed or tapered to generate the desired function. A graphical representation showing a typical curve relating the function $f_2(P_T/P_{am})$ and the pressure ratio $P_T/P_{am}$ is shown in FIG. 5 of the drawing. It will be understood that this relationship is derived by an iterative process of empirically fitting curves to known engine performance data relating the variables in Equation 1.

It will be noted from Equation 1 that the production of a resultant output signal variable in accordance with the gross thrust $F_g$ requires a multiplication of the pressure ratio variable $f_2(P_T/P_{am})$ by the ambient pressure variable $P_{am}$. This multiplication is accomplished by energizing resistance element 40 of potentiometer 39 by connection to a source of voltage variable in accordance with the variable $P_{am}$. This source of variable voltage is developed across a potentiometer 43 which is electrically connected, as shown, to the wiper arm 30 of potentiometer 31. The voltage across resistance element 44 therefore varies in accordance with the voltage $V_2$, which is the signal output voltage of the ambient pressure transducer 24. It will be noted that the connection between resistance 40 of potentiometer 39 and potentiometer 43 is through wiper arm 45 of potentiometer 43. By manually adjusting the position of wiper arm 45, an adjustment of voltage $V_6$ is obtained for the purpose of setting the scale factor constant $K_3$ in Equation 1. With this arrangement the voltage $V_5$ across wiper arm 41 and ground varies in accordance with the following relationship:

$$V_5 \propto K_3 P_{am} f_2(P_T/P_{am})$$

The voltage $V_5$ is therefore a resultant signal variable in accordance with the gross thrust $F_g$ as indicated by Equation 1. In order to provide a suitable read-out mechanism, there is provided a servo-driven thrust indicator 46 which indicates the gross thrust output of the jet engine 10. The gross thrust indicator has a movable pointer 47 schematically indicated as being mechanically driven by a shaft 48 positioned by a servomotor 49 through a gear train 50. The servomotor is controlled by a suitable polarity-sensitive servo amplifier 51 having two input leads, one of which is connected, as shown, to the wiper arm 41 of potentiometer 39. The other input lead of the servo amplifier is connected to the wiper arm 52 of another potentiometer 53 having a linear resistance element 54, one end of which is grounded. The other end of the resistance element 54 is connected to the power supply lead $V_S$ as shown. The wiper arm 52 is coupled by means of a shaft 55 to the gear train 50 so that it is positioned along with the pointer 47 of the thrust indicator by the servomotor 49. With this arrangement the servomotor will drive the wiper arm 52 of potentiometer 53 to a position such that the voltage $V_7$ across the wiper arm 52 and ground balances the voltage $V_5$ across the wiper arm 41 and ground. The function of the servo mechanism is therefore to position the pointer 47 of the thrustmeter 46 in accordance with the voltage $V_5$ which is the resultant output signal of the computer apparatus used to mechanize Equation 1. The thrustmeter 46 therefore indicates the gross thrust output of jet engine 10.

FIG. 2 of the drawing shows a modification of the gross thrust measurement system of FIG. 1 for use with a turbofan jet engine having primary and secondary nozzles. The turbofan engine 56 is shown schematically as comprising a casing 57 housing interconnected compressor and turbine elements 58 and 59 mounted for rotation ahead of the diffuser 60. Downstream of the diffuser is a free-wheeling turbofan rotor 61 having a bucket portion 62 propelled by the gas stream subsequently expelled through the primary nozzle 63, and a blade portion 64 propelling inducted air subsequently expelled through the secondary nozzle 65. The system utilized for indicating gross thrust of this engine is similar to that disclosed and described in the arrangement of FIG. 1, and similar parts have been identified by the same reference numerals. The modification of the system of FIG. 1 for use with the turbofan engine involves a change in the construction of the engine total pressure transducer to provide for sensing and averaging the pressures in both the primary and secondary nozzles of the turbofan engine in order to adapt the system to follow more closely the operating characteristics of this engine. The modified pressure transducer comprises two pressure-sensing units identified generally by the numerals 66 and 67 which are arranged to sense, respectively, the total pressures in the primary nozzle 63 and the secondary nozzle 65 of the engine. The pressure transducer 66 comprises a flexible bellows 68, the upper end of which is connected to a probe 69 having an outer end directed into the gas stream ahead of the primary nozzle. The other end of the bellows 68 is connected to a lever 70, one end of which is pivotally mounted on a fixed support 71. The other end of the lever 70 is connected to actuate a wiper arm 72 of a potentiometer 73. The potentiometer 73 has a resistance element 74, one end of which is grounded and the other connected to the power supply lead $V_S$. In order to make the flexible bellows 68 responsive to absolute pressure, the transducer unit 66 is encased in an evacuated housing indicated by the dash lines 75.

The engine pressure transducer unit 67 is similarly constructed and comprises a flexible bellows 76 connected to a pressure probe 77, the outer end of which is arranged to project into the gas stream upstream with respect to the secondary nozzle 65. The lower end of the bellows 76 is connected to actuate a lever 78 pivotally mounted on a fixed support 79, the other end of the lever being connected to the wiper arm 80 of a potentiometer 81 comprising a resistor 82 connected across the power supply terminal $V_S$ and ground.

With this arrangement a voltage signal $V_8$ is developed across the wiper arm 72 and ground in pressure transducer unit 66, which is variable in accordance with the total pressure head in primary nozzle 63 of the engine. Similarly, a voltage $V_9$ is developed across the wiper arm 80 and ground of pressure transducer 67, which varies in accordance with the total pressure head in the secondary nozzle 65 of the engine. For the purpose of providing a signal voltage variable as the average of the voltages $V_8$ and $V_9$, two transformers 82 and 83 are utilized. The transformers 82 and 83 have primary windings 84 and 85 with a common grounded connection as shown. The remaining two leads of the primary windings are connected respectively, to the wiper arm 80 of pressure transducer unit 67 and the wiper arm 72 of the pressure transducer unit 66 so that the primary windings of the transformers 82 and 83 are energized, respectively, in accordance with the magnitudes of the signal voltages $V_9$ and $V_8$. The transformers 82 and 83 have secondary windings 86 and 87, respectively, serially connected and grounded on one side. With this arrangement there exists between ground and the remaining lead of secondary winding 86 a voltage variable in accordance with the weighted average of the voltages $V_8$ and $V_9$, this voltage $V_A$ being expressed by the following equation:

$$V_A \propto \frac{kP_{TP}+P_{TS}}{2}$$

where $P_{TP}$ is the total pressure in the primary nozzle 61 and $P_{TS}$ the total pressure in secondary nozzle 65 of the jet engine. Depending on the characteristics of the turbofan engine, the average nozzle pressure may be a weighted average. For that reason a weighting factor $k$, which may have a value of 1 or some other value, is introduced into the above relationship dealing with the expression of average nozzle pressure. With this voltage applied to the servo amplifier 36 in the manner shown, the thrust indicator 46 indicates the gross thrust of the turbofan engine in accordance with the following equation:

(2) $$F_g = K_4 P_{am} f_2\left(\frac{kP_{TP}+P_{TS}}{2P_{am}}\right)$$

wherein:

$F_g$ = gross thrust
$K_4$ = scale factor constant
$P_{am}$ = ambient pressure (absolute)
$P_{TP}$ = primary nozzle total pressure (absolute)
$P_{TS}$ = secondary nozzle total pressure (absolute)

$$f_2\left(\frac{kP_{TP}+P_{TS}}{2P_{am}}\right) = \text{function of}\left(\frac{kP_{TP}+P_{TS}}{2P_{am}}\right)$$

$k$ = weighting factor

The operation of the thrustmeter system of FIG. 2 is otherwise the same as that already described in connection with FIG. 1.

FIG. 3 of the drawing shows a further modification of the system of FIG. 1 for use with a jet engine having a variable nozzle. Such engines also typically are provided with an afterburner.

The gross thrust computing and indicating system of FIG. 3 is similar in construction and function to that shown in FIG. 1; and to avoid needless repetition, corresponding parts have been identified by the same numbers and it will be understood that their function is the same as that already described in connection with the system of FIG. 1 except for differences specifically noted. The difference in the system of FIG. 3 lies in the modification of the gross thrust computing apparatus to introduce multiplication of an additional signal variable in accordance with the area of the engine nozzle as will now be described.

The variable nozzle jet engine identified generally by the numeral 88 is represented schematically as comprising a casing 89 housing interconnected turbine and compressor elements 91 and 90. Downstream of the turbine are a diffuser 92, an afterburner 93, and finally a variable nozzle 94. It will be understood that the area $A_n$ of the nozzle 94 is adjusted by a suitable mechanism including a rotatable shaft 95. The computer apparatus is modified to give a resultant signal in accordance with the following equation:

(3) $\quad F_g = K_2 P_{am} f_3(A_n) f_2(P_T/P_{am})$ wherein:

$K_2$ = scale factor constant
$P_T$ = total nozzle pressure (absolute)
$P_{am}$ = ambient pressure (absolute)
$f_3(A_n)$ = function of nozzle area
$A_n$ = area of nozzle
$f_2(P_T/P_{am})$ = function of $(P_T/P_{am})$ As will be apparent from an inspection of Equation 3, an addition variable $f_3(A_n)$ must be multiplied to take into account the variation in the gross thrust $F_g$ caused by adjustment of the area of variable nozzle 94. To accomplish this, the computer apparatus is provided with an additional potentiometer 96 interposed between the servo amplifier 51 and the wiper arm 41 of potentiometer 39. The potentiometer 96 has a resistor 97, the resistance of which is varied or tapered to provide resistance variation in accordance with the desired function $f_3(A_n)$ with movement of the wiper arm 98. One end of the resistor 97 is grounded and the other connected to wiper arm 41 of potentiometer 39.

The wiper arm 98 is connected to shaft 95, as shown, so as to be positioned on resistor 97 in accordance with the degree of opening of nozzle 94 of the jet engine 88. Since the voltage $V_5$ used to energize potentiometer 96 varies in accordance with the product of $K_1 f_1(P_{am})$ and $f_2(P_T/P_{am})$, the voltage $V_8$ across wiper 98 and ground with the additional multiplication of the quantity $f_3(A_n)$ varies in accordance with the relationship $$V_8 \propto K_1 f_1(P_{am}) f_2(P_T/P_{am}) f_3(A_n)$$

and hence is indicative of gross thrust $F_g$ as per Equation 3. The servo-driven thrust indicator 46 which is positioned in accordance with the voltage $V_8$ therefore indicates the desired quantity gross thrust $F_g$. Except for the additional multiplication performed by the potentiometer 96, the operation of the thrust computing and indicating system is the same as that described in connection with the system of FIG. 1. A graphical representation showing the typical relation between the function $f_3(A_n)$ and the nozzle area $A_n$ for a particular engine is shown in FIG. 6 of the drawing. Here again this relationship is determined from Equation 3 with known engine performance data as in the case of the function $f_2(P_T/P_{am})$ depicted in FIG. 5.

Figure 4:
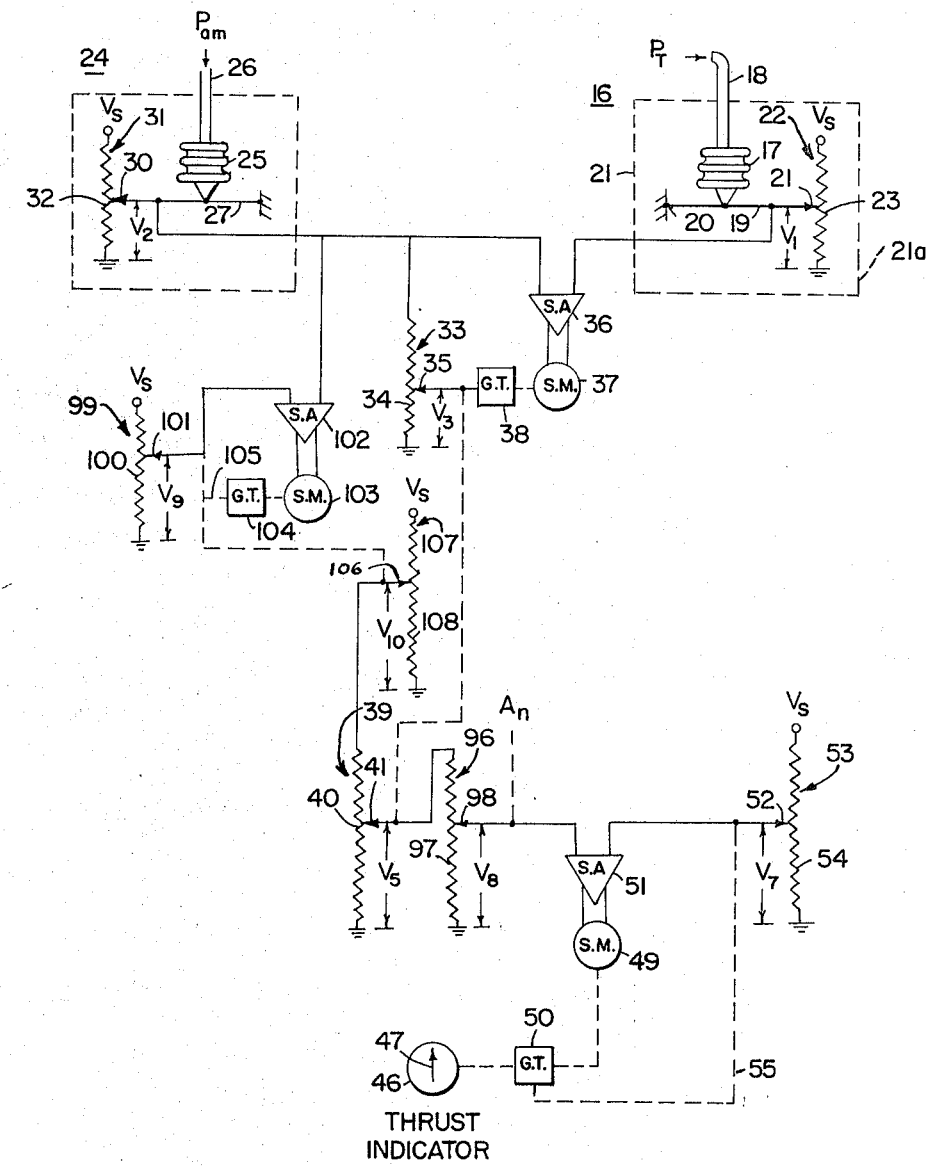
FIG. 4 shows a modification of the system of FIG. 3 including as a refinement the addition of a function generator to modify the output of the ambient pressure transducer.

In using the gross thrustmeter apparatus embodying the present invention with some engines, more precise thrust indication may be obtained by introduction of a third function generator to modify the ambient pressure variable $P_{am}$ by an empirically determined function determined by use of known engine performance data. The modification of the computing apparatus to utilize this refinement is shown in FIG. 4 of the drawing. While the showing of the engine has been omitted in this figure, it will be understood that the pressure transducers 16 and 24 are responsive to engine nozzle total pressure and ambient pressure, respectively, as in the arrangements of FIGS. 1, 2, and 3.

The equation setting forth the relationship of the functions and variables in this arrangement is as follows:

(4) $\quad F_g = K_1 f_1(P_{am}) f_2(P_T/P_{am}) f_3(A_n)$ wherein:

$F_g$ = gross thrust
$K_1$ = scale factor constant
$f_1(P_{am})$ = function of $P_{am}$
$P_{am}$ = ambient pressure (absolute)
$f_2(P_T/P_{am})$ = function of $P_T/P_{am}$
$P_T$ = total nozzle pressure (absolute)
$A_n$ = nozzle area
$f_3(A_n)$ = function of nozzle area The system of FIG. 4 is much the same as that of FIG. 3 and similar parts have been assigned the same reference numerals, and the function of these parts is the same except for differences noted. The difference in this system lies in the substitution of two servo-driven potentiometers for the manually adjusted potentiometer 43 of FIG. 3. One of the potentiometers has a resistance element designed or tapered to act as a generator of the function $f_1(P_{am})$ in Equation 4. Thus, referring to FIG. 4, it will be noted that there is provided a potentiometer 99 having a resistance element 100 with one end grounded and the other energized from the voltage supply $V_S$. A wiper 101 of this potentiometer is driven by a servomotor system so that it is positioned and develops a voltage $V_9$ variable in accordance with the output voltage $V_2$ of the ambient pressure transducer 24. As shown, this servo system, which is similar to the others used in the computer apparatus, comprises a polarity-sensitive servo amplifier 102 having input connections to wipers 101 and 30 and an output connected to control a servomotor 103 which drives a gear train 104. The gear train has an output shaft which is connected to and acts to rebalance wiper 101 of potentiometer 99. It is also connected to and positions simultaneously a wiper 106 of another potentiometer 107. The potentiometer 107 has a resistance element 108 which is designed or tapered to act as a generator of the function $f_1(P_{am})$. Thus, the voltage $V_{10}$ appearing across the wiper 106 and ground varies in accordance with the quantity $f_1(P_{am})$. By connecting the wiper arm 106 to energize the potentiometer 39, the quantity $f_1(P_{am})$ is multiplied together with the other quantities $f_2(P_T/P_{am})$ and $f_3(A_n)$ as should now be clear from the preceding description of the systems of FIGS. 1, 2, and 3.

From the foregoing, it will be apparent that there has been provided in accordance with the present invention gross thrustmetering apparatus which is relatively simple because the computation of the resultant quantity indicative of the gross thrust of the jet engine involves only multiplication, which can be done with a simple computer. Furthermore, the system has the advantage of being universal in nature since it may be easily adapted to different types of jet engines with only minor modification as is apparent from a consideration of the various engine applications described above. Since different function generators may be substituted easily to accomplish this adaptation without changing the basic components of the system and since the system is inherently quite simple, the cost of manufacture and service of the equipment is greatly reduced and its reliability is enhanced.

While there have been described what are at present considered to be the preferred embodiments of the invention, it will be apparent to those skilled in the art that various changes and modifications may be made therein without departing from the spirit or scope of the invention.

What we claim as new and desired to secure by Letters Patent of the United States is:

1. A thrustmeter for indicating the gross thrust of a jet engine having primary and secondary nozzles comprising a first pressure transducer responsive to both primary nozzle total pressure and secondary nozzle total pressure and producing a weighted average nozzle pressure signal variable in accordance with the weighted average of said primary and secondary total nozzle pressures, a second pressure transducer responsive to ambient pressure and producing an ambient pressure signal variable in accordance with said ambient pressure, means combining said weighted average nozzle pressure and said ambient pressure signals to produce a pressure ratio signal variable in accordance with a function of the ratio of said weighted average nozzle pressure and ambient pressure signals, means multiplying said pressure ratio and ambient pressure signals to produce a resultant signal indicative of gross thrust, and indicating means responsive to said resultant signal for indicating gross thrust of said jet engine.

2. Apparatus for computing and indicating the gross thrust of a jet engine having primary and secondary nozzles comprising a first pressure transducer responsive to both primary nozzle total pressure and secondary nozzle total pressure and producing a signal variable in accordance with the weighted average of said primary and secondary nozzle total pressures, a second pressure transducer responsive to ambient pressure and producing a signal variable in accordance with said ambient pressure, computer means responsive to input signals from said first and second pressure transducers and producing a resultant signal indicative of gross thrust of said jet engine in accordance with the equation:

$$F_g = K_4 P_{am} f_2\left(\frac{kP_{TP}+P_{TS}}{2P_{am}}\right)$$

wherein:

$F_g$ = gross thrust
$K_4$ = scale factor constant
$P_{am}$ = ambient pressure (absolute)
$P_{TP}$ = primary nozzle total pressure (absolute)
$P_{TS}$ = secondary nozzle total pressure (absolute)

$$f_2\left(\frac{kP_{TP}+P_{TS}}{2P_{am}}\right) = \text{function of } \left(\frac{kP_{TP}+P_{TS}}{2P_{am}}\right)$$

$k$ = weighting factor and gross thrust indicating means responsive to said resultant signal.

3. Apparatus for computing and indicating the gross thrust of a jet engine having a variable nozzle comprising a first pressure transducer responsive to the total nozzle pressure of said jet engine and producing a signal variable in accordance with said total nozzle pressure, a second pressure transducer responsive to ambient pressure and producing a signal variable in accordance with ambient pressure, a third transducer responsive to the degree of opening of said nozzle and producing an output signal variable as a function of the area of opening of said nozzle, computer means responsive to input signals from said first, second, and third transducers and producing a resultant signal indicative of gross thrust of said jet engine in accordance with the equation:

$$F_g = K_2 P_{am} f_3(A_n) f_2(P_T/P_{am})$$

wherein:

$F_g$ = gross thrust
$K_2$ = scale factor constant
$P_T$ = total nozzle pressure (absolute)
$P_{am}$ = ambient pressure (absolute)
$f_3(A_n)$ = function of nozzle area
$A_n$ = area of nozzle
$f_2(P_T/P_{am})$ = function of $(P_T/P_{am})$ and gross thrust indicating means responsive to said resultant signal.

4. Apparatus for computing and indicating the gross thrust of a jet engine having a variable nozzle comprising a first pressure transducer responsive to the total nozzle pressure of said jet engine and producing a signal variable in accordance with said total nozzle pressure, a second pressure transducer responsive to ambient pressure and producing a signal variable in accordance with ambient pressure, a third transducer responsive to the degree of opening of said nozzle and producing an output signal variable as a function of the area of opening of said nozzle, computer means responsive to input signals from said first, second, and third transducers and producing a resultant signal indicative of gross thrust of said jet engine in accordance with the equation:

$$F_g = K_1 f_1(P_{am}) f_2(P_T/P_{am}) f_3(A_n)$$

wherein:

$F_g$ = gross thrust
$K_1$ = scale factor constant
$f_1(P_{am})$ = function of $P_{am}$
$P_{am}$ = ambient pressure (absolute)
$f_2(P_T/P_{am})$ = function of $P_T/P_{am}$
$P_T$ = total nozzle pressure (absolute)
$f_3(A_n)$ = function of nozzle area
$A_n$ = nozzle area and gross thrust indicating means responsive to said resultant signal.

References Cited by the Examiner

UNITED STATES PATENTS

| | | | |
|---|---|---|---|
| 2,941,399 | 6/1960 | Bersinger | 73—116 |
| 2,981,098 | 4/1961 | Antippas et al. | 73—116 |
| 3,001,716 | 9/1961 | Weiss | 235—193 |
| 3,019,604 | 2/1962 | Hall | 73—116 X |
| 3,125,677 | 3/1964 | Newell | 235—193 |

MALCOLM A. MORRISON, *Primary Examiner.*

D. W. COOK, *Examiner.*

C. L. WHITHAM, I. KESCHNER, *Assistant Examiners.*